US006183096B1

United States Patent
Galicia

(10) Patent No.: US 6,183,096 B1
(45) Date of Patent: Feb. 6, 2001

(54) REAR VIEW MIRROR FOR A VEHICLE

(76) Inventor: Joseph R. Galicia, 5902 Dorothy Ct., Clinton, MD (US) 20735

( * ) Notice: Under 35 U.S.C. 154(b), the term of this patent shall be extended for 0 days.

(21) Appl. No.: 08/340,339

(22) Filed: Nov. 14, 1994

(51) Int. Cl.⁷ .................................................. G02B 7/182
(52) U.S. Cl. .......................... 359/871; 359/872; 359/873; 359/850
(58) Field of Search .................................... 359/850, 851, 359/853, 855, 871, 872, 877, 865, 861, 874, 843, 844, 873, 876, 881; 248/466, 476, 477, 481, 475.1

(56) References Cited

U.S. PATENT DOCUMENTS

| | | | |
|---|---|---|---|
| 2,210,147 | 8/1940 | Griffith | 359/865 |
| 3,377,117 * | 4/1968 | Biscow | 248/481 |
| 3,542,456 * | 11/1970 | Huge | 248/476 |
| 4,025,173 | 5/1977 | Schmaedeke | 359/855 |
| 4,268,120 * | 5/1981 | Jitsumori | 359/850 |
| 4,439,013 | 3/1984 | Hagn et al. | 359/509 |
| 4,727,302 * | 2/1988 | Mizuta et al. | 359/877 |
| 4,728,180 | 3/1988 | Janowicz | 359/841 |
| 4,815,689 | 3/1989 | Schiff | 359/855 |
| 4,890,909 * | 1/1990 | Schmidt et al. | 359/865 |
| 4,921,337 | 5/1990 | Hou | 359/850 |
| 4,940,320 | 7/1990 | Tribble | 359/855 |
| 4,973,146 * | 11/1990 | Nakayama | 359/877 |
| 4,998,812 | 3/1991 | Hou | 359/850 |
| 5,007,724 * | 4/1991 | Hou | 359/877 |
| 5,008,603 * | 4/1991 | Nakayama et al. | 359/877 |
| 5,033,835 * | 7/1991 | Platzer, Jr. | 359/874 |
| 5,107,374 | 4/1992 | Lupo et al. | 359/841 |
| 5,143,342 * | 9/1992 | Hutchinson et al. | 248/476 |
| 5,268,796 * | 12/1993 | Tomerlin et al. | 359/877 |

FOREIGN PATENT DOCUMENTS

| | | | |
|---|---|---|---|
| 3705574 * | 9/1988 | (DE) | 248/476 |
| 0 028 860 A1 | 5/1981 | (EP) . | |

* cited by examiner

Primary Examiner—Mohammad Y. Sikder
(74) Attorney, Agent, or Firm—Banner & Witcoff, Ltd.

(57) ABSTRACT

One embodiment of a mirror assembly for a vehicle includes a first mirror attached externally to the vehicle for providing a side rear view along a side of the vehicle to a driver of the vehicle, and a second mirror attached internally to the vehicle to a roof-supporting column of the vehicle for providing a blind spot view to the driver, with the first and second mirrors being separately adjustable. Another embodiment includes a third mirror attached externally to the vehicle for providing a side rear view along another side of the vehicle to the driver of the vehicle, and a fourth mirror attached internally to the vehicle to another roof-supporting column of the vehicle for providing a blind spot view to the driver, with the third and fourth mirrors being separately adjustable.

17 Claims, 8 Drawing Sheets

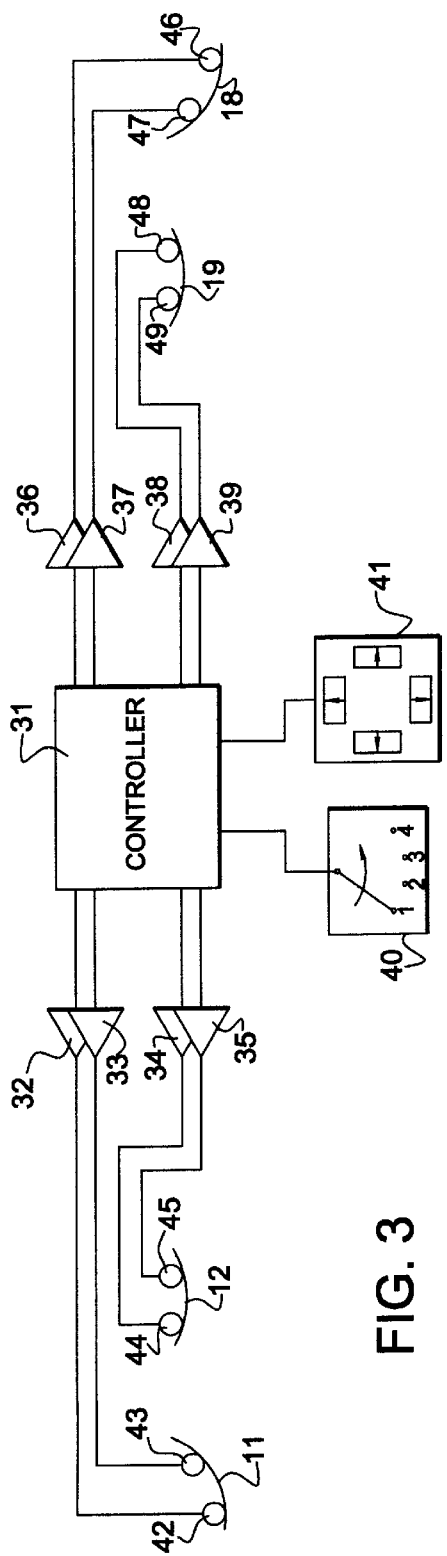
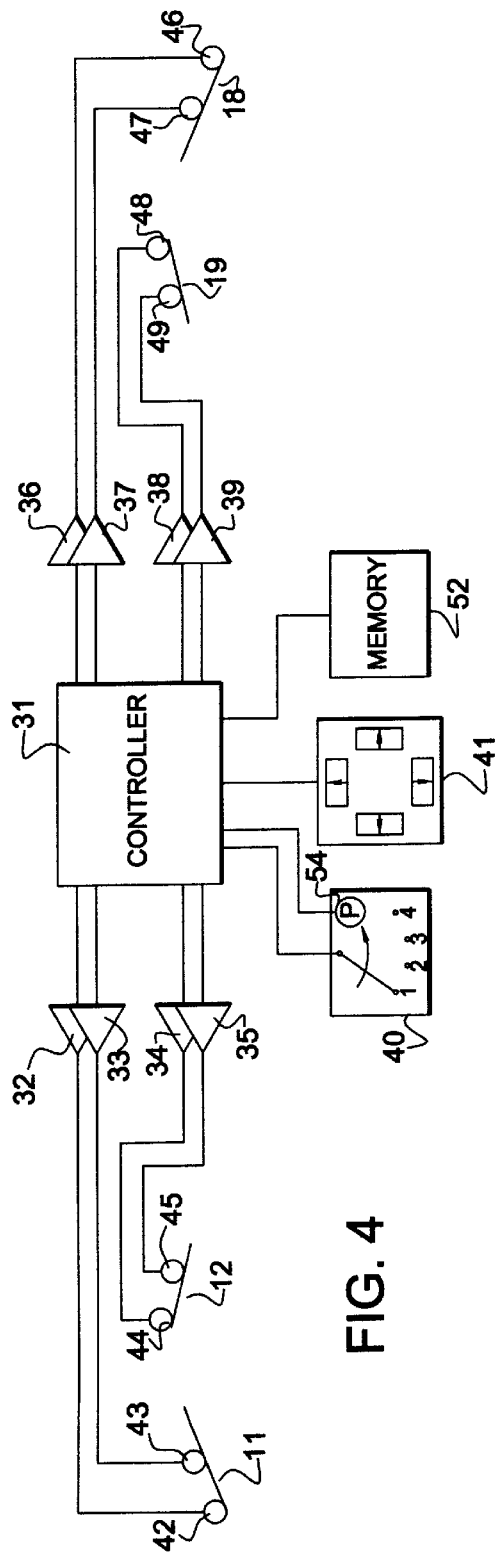
FIG. 3
FIG. 4

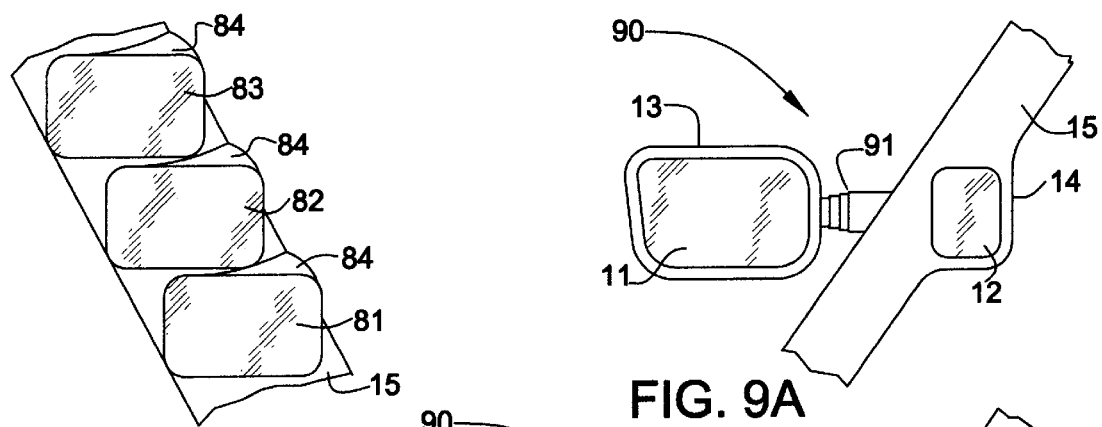
FIG. 8
FIG. 9A
FIG. 9B
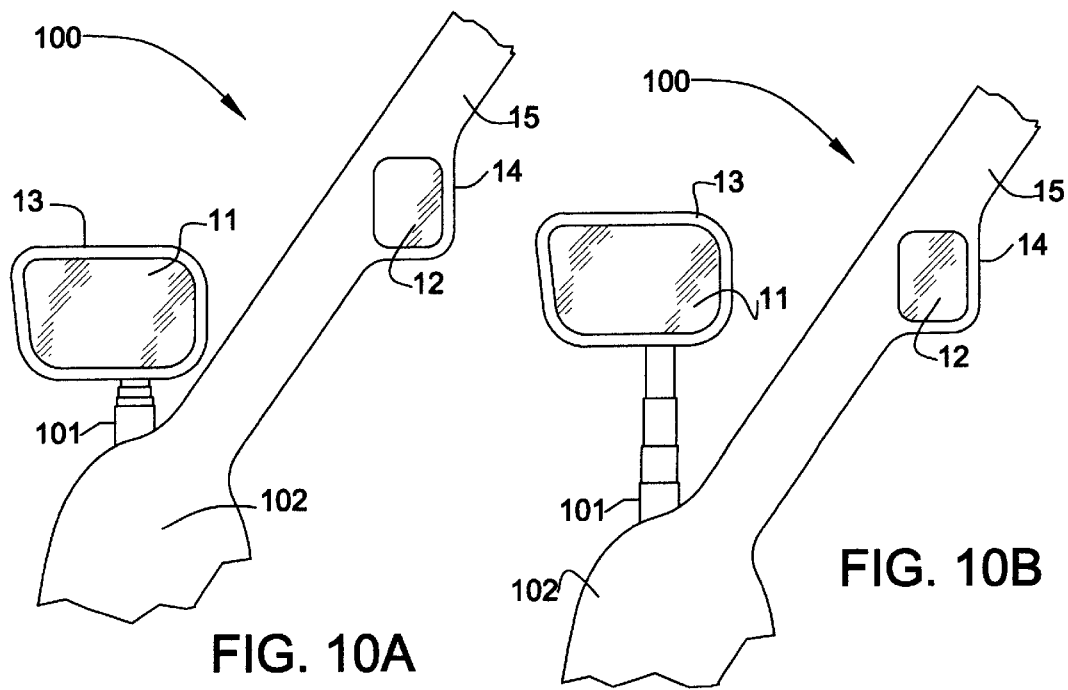
FIG. 10A
FIG. 10B

REAR VIEW MIRROR FOR A VEHICLE

BACKGROUND OF THE INVENTION

1. Field of the Invention

The present invention relates to rear view mirrors for vehicles. More particularly, the present invention relates to a side rear view mirror arrangement for eliminating a blind spot associated with side rear view mirrors.

2. Description of the Related Art

Side rear view mirrors have been installed on vehicles for safely operating a vehicle because a side rear view mirror allows a driver to determine, for example, whether an adjacent lane is clear to the side and rear of the vehicle before making a lane change. However, side rear view mirrors inherently have a blind spot. Accordingly, there have been a number of attempts at eliminating the blind spot by improving side rear view mirrors.

For example, U.S. Pat. No. 2,210,147 to Griffith discloses a rear view mirror arrangement for a vehicle which includes an external rear view mirror mounted to the vehicle with an outside arm and an interior mirror mounted to the interior of the vehicle with an inside arm. The outside and inside arms are connected together and clamped to a door frame of the vehicle. The two mirrors can be adjusted independently of each other. Nevertheless, the entire assembly requires that a driver take care to avoid the internal mirror when the door is opened.

Another example of an improved side rear view mirror is disclosed in U.S. Pat. No. 4,025,173 to Schmeadeke. The Schmeadeke mirror arrangement includes two side rear view mirrors externally mounted to a vehicle and arranged one above the other on a shaft of a mounting bracket. The upper mirror is rotatably mounted on the shaft for allowing the mirror to be adjusted around the shaft. The lower mirror is non-rotatably mounted on the shaft providing simultaneous rotation of the two mirrors when the lower mirror is rotated. A similar side rear view mirror, disclosed in U.S. Pat. No. 4,940,320 to Tribble, includes a pair of independently adjustable mirrors externally mounted on a frame which is adjustably secured to a vehicle.

Yet another example of an improved side rear view mirror is disclosed in U.S. Pat. No. 4,439,013 to Hagn et al. The Hagn et al. mirror arrangement includes an external side rear view mirror mounted to a bracket located a corner of a door window of a vehicle and a supplementary mirror disposed on the inside of the side door opposite the external rear view mirror. The supplementary mirror is mounted within a housing configured as an air outlet device for an air delivery passage of the vehicle ventilating system so that fogging of the side window pane is prevented or rapidly removed.

U.S. Pat. No. 4,815,689 to Schiff discloses an adjustable side-mounted rear-view mirror having two component mirrors. The two mirrors are attached to a vehicle so that one mirror is external to the vehicle, while the second mirror is mounted internally to the vehicle. A mounting device rigidly joins the two mirrors so that their reflective surfaces lie in a common plane and are adjustable together as a single unit about the common vertical and horizontal axes of the two mirrors. The mounting device can be attached to a forward roof-supporting post of the vehicle, but is preferably mounted to a window corner bracket.

SUMMARY OF THE INVENTION

The present invention achieves safer conditions for operating a vehicle by providing a mirror assembly for a vehicle which includes a first mirror attached externally to the vehicle for providing a side rear view along a side of the vehicle to a driver of the vehicle, and a second mirror attached internally to the vehicle to a roof-supporting column of the vehicle for providing a blind spot view to the driver, with the first and second mirrors being separately adjustable. The first and second mirrors are also adjustable along the roof-supporting column. Preferably, the first and second mirrors are disposed with respect to each other so that a reflected image of the first mirror and a reflected image of the second mirror appear to the driver to have substantially no gap between the respective reflected images of the first and second mirrors. The second mirror has a housing which is integrally formed to the roof-supporting column. At least one of the first and second mirrors can include a plurality of partially reflecting mirrors or be convex mirrors for increasing the overall field-of-view provided by the mirror assembly. With the present invention, a driver can see a side rear view of the vehicle in addition to having a view of the blind spot.

By using the present invention, a driver is able to quickly and safely determine whether an adjacent lane is clear to the side and rear of the vehicle before making a lane change because configuration of the first and second mirrors provides a wider and, consequently, a safer field of view. Since the present invention provides more visibility to the driver, the driver has more time to respond to or avoid a hazardous traffic situation. The present invention also allows a driver to spend more time facing the on-coming road by requiring less head turning when checking a blindspot.

The mirror arrangement according to the present invention also includes a control system coupled to the first and second mirrors for adjusting the first and second mirrors separately or in unison by remote control. The control system can include a memory for storing a plurality of preset positions of the first and second mirrors.

Another configuration of the present invention includes a third mirror attached externally to the vehicle for providing a side rear view along another side of the vehicle to the driver of the vehicle, and a fourth mirror attached internally to the vehicle to a second roof-supporting column of the vehicle for providing a blind spot view to the driver, with the third and fourth mirrors being separately adjustable. Preferably, the third and fourth mirrors are disposed with respect to each other so that a reflected image of the third mirror and a reflected image of the fourth mirror appear to the driver to have substantially no gap between the respective reflected images of the third and fourth mirrors. The fourth mirror has a housing which is integrally formed with the second roof-supporting column When the mirror arrangement according to the present invention includes third and fourth mirrors, the control system is capable of adjusting all four mirrors separately or in unison by remote control and includes a memory for storing a plurality of preset positions of the four mirrors.

Yet another embodiment of the present invention provides a mirror assembly for a vehicle including a first mirror attached internally to the vehicle to a roof-supporting column of the view for providing a side rear view along a side of the vehicle to a driver of the vehicle, and a second mirror attached internally to the vehicle to the roof-supporting column of the vehicle for providing a blind spot view to the driver, such that the first and second mirrors are positioned on the roof-supporting column one above the other, and the first and second mirrors are separately adjustable. In one version of this embodiment, the first and second mirrors are disposed with respect to each other so that a reflected image of the first mirror and a reflected image of the second mirror appear to the driver to have substantially no gap between the respective reflected images of the first and second mirrors. This embodiment can include a third mirror positioned on the roof-supporting column above the first and second mirror. A control system coupled to the first and second mirrors is used for adjusting the first and second mirrors by remote control.

BRIEF DESCRIPTION OF THE DRAWINGS

The various objects and features of the present invention, together with other advantages and benefits which may be attained by its use, will become more apparent in view of the following detailed description of the invention taken in conjunction with the drawings. In the drawings, wherein like reference numerals identify corresponding portions of the various embodiments of the display system according to the present invention:

FIG. 3 shows a schematic block diagram of a control system for automatically positioning the mirrors of the present invention separately or in unison by remote control.

FIG. 4 shows a schematic block diagram of a control system having a memory for automatically adjusting the mirrors of the present invention separately or in unison by remote control.

FIG. 8 shows a fourth embodiment of a left side rear view mirror arrangement according to the present invention.

FIGS. 9A and 9B show a fifth embodiment of a left side rear view mirror arrangement according to the present invention.

FIGS. 10A and 10B show a sixth embodiment of a left side rear view mirror arrangement according to the present invention.

DETAILED DESCRIPTION OF THE PREFERRED EMBODIMENTS

Figure 1A:
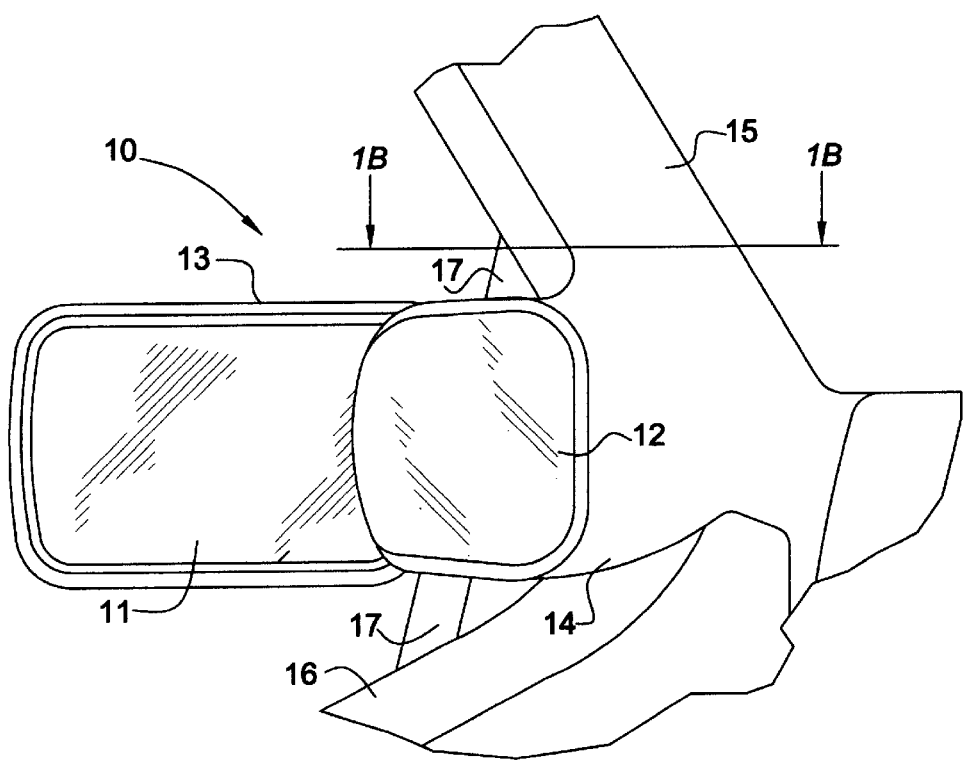
FIG. 1A shows a perspective view of a first embodiment of a side rear view mirror arrangement according to the present invention for a vehicle having a door without an window frame.
Figure 1B:
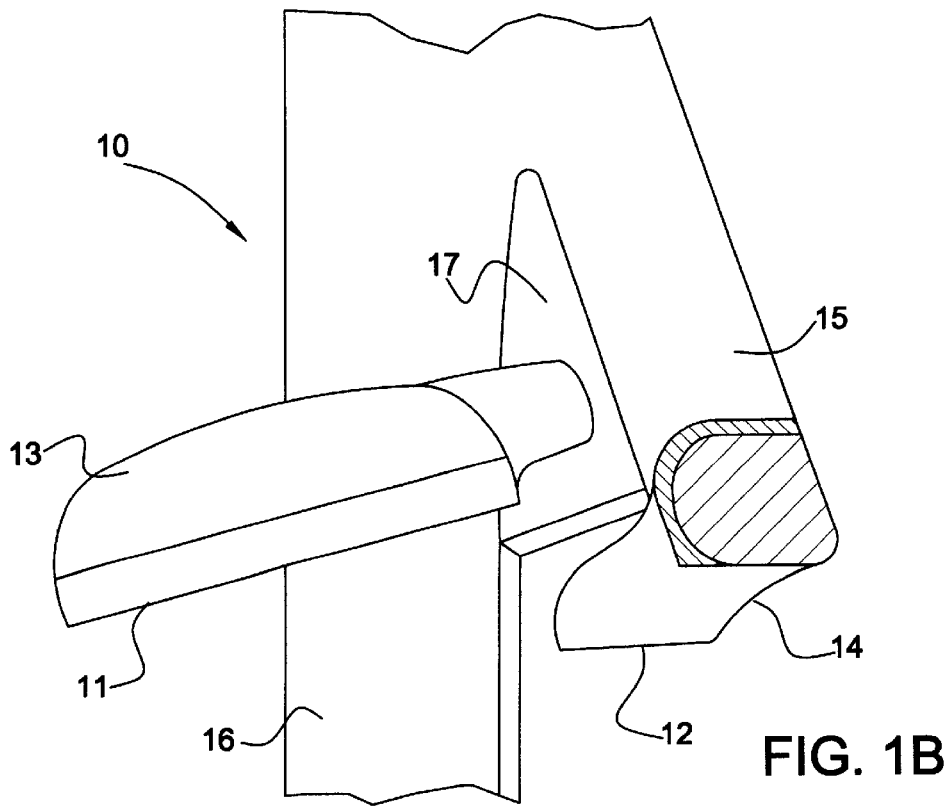
FIG. 1B is a top view of the first embodiment of a side view mirror according to the present invention taken along line 1—1 in FIG. 1A.

FIGS. 1A and 1B show perspective and top views, respectively, of a first embodiment of a driver's side rear view mirror arrangement 10 according to the present invention. This embodiment is particularly suited for a vehicle having a door without an window frame, however, the general configuration of the first embodiment is not changed for a vehicle having a door with a window frame.

Mirror arrangement 10 includes a first mirror 11 attached externally to the left side of the vehicle and a second internal mirror 12 mounted to the left roof-supporting column 15 of the vehicle. External mirror 11 is adjustably mounted within an exterior mirror housing 13 which is attached to a window corner bracket 17 of door 16 of the vehicle. Internal mirror 12 is adjustably mounted within mirror housing 14 which is integrally formed with roof-supporting column 15.

Figure 1C:
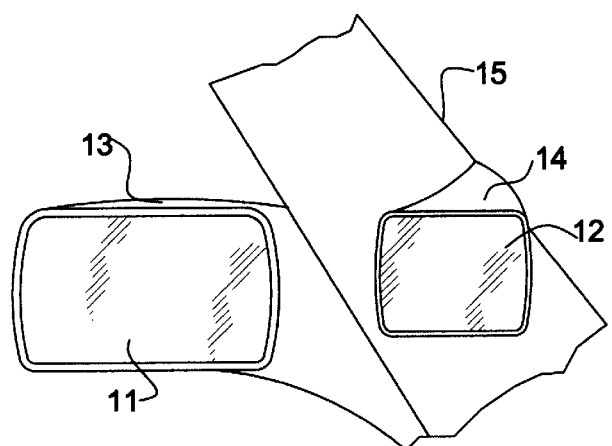
FIG. 1C shows a perspective view of another version of the first embodiment of the present invention.

As shown in FIG. 1A, mirrors 11 and 12 are preferably disposed with respect to each other so the reflected images of the mirrors appear to have no gap between the respective reflected images. Of course, mirrors 11 and 12 can be disposed with respect to each other so that the respective reflected images appear to the driver to be separated by a gap. Each mirror is separately adjustable around horizontal and vertical adjustment axes for eliminating a blind spot on the driver's side of the vehicle which is normally associated with conventional side-view vehicle mirrors. FIG. 1C shows another version of the first embodiment of the present invention.

Figure 2A:
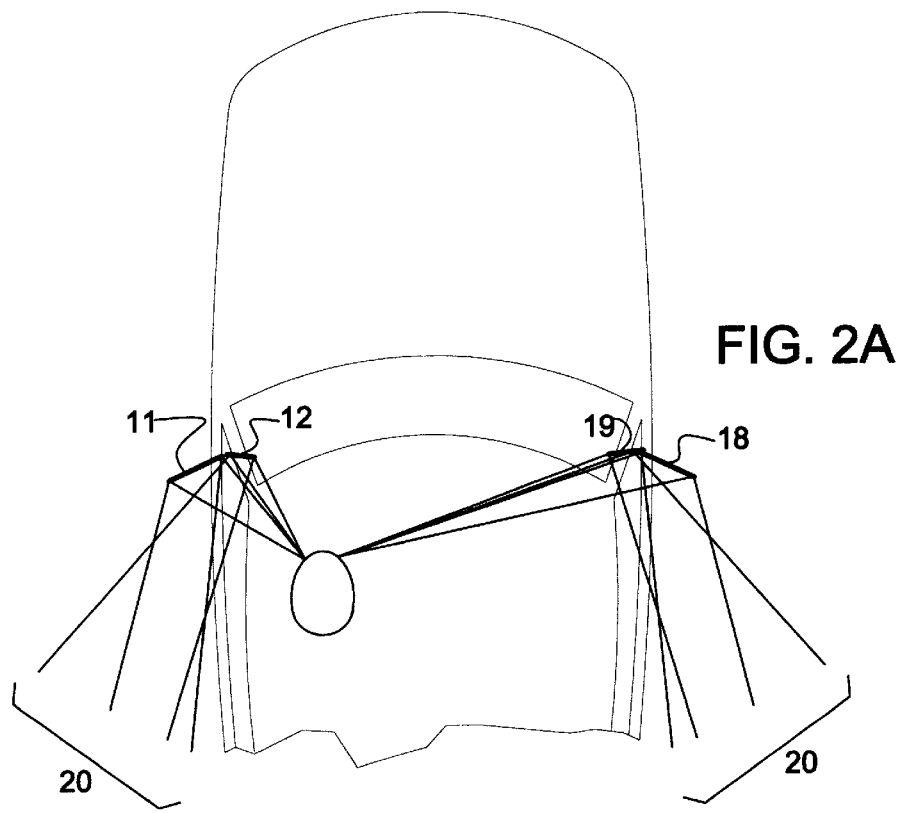
FIG. 2A shows a top view of the field-of-view attained for a vehicle equipped with side view mirrors according to the present invention.
Figure 2B:
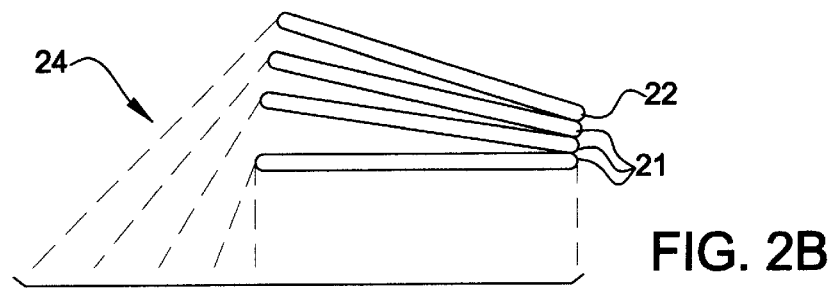
FIG. 2B shows a mirror assembly having a plurality of partially reflecting mirrors and one fully reflecting mirror for increasing the overall field-of-view covered by the mirror assembly and which can be used for any of mirrors of the present invention.

A second similar mirror arrangement of mirrors 18 and 19, shown in FIG. 2A, can be mounted on the right side of the vehicle for eliminating a blind spot on the passenger side of the vehicle. FIG. 2A also shows the overall field-of-view 20 covered by mirrors 11, 12, 18 and 19. FIG. 2B shows a mirror assembly 24 having a plurality of partially reflecting mirrors 21 and one fully reflecting mirror 22 for increasing the field-of-view 23 covered by the mirror assembly. Mirror assembly 24 can be used for any of the individual mirrors 11, 12, 18 and 19. The individual mirrors of the present invention can also be convex mirrors (FIG. 3) for further increasing the field-of-view covered by the mirror assembly.

With the mirror arrangement of the present invention, a driver is able to quickly and safely determine whether an adjacent lane is clear to the side and rear of the vehicle before making a lane change because the present invention provides a simultaneous view of both the rear side view of the vehicle and the associated blind spot. By providing a wider and safer field-of-view, the present invention permits a driver's eyes to be directed toward the on-coming road a greater amount of time because less head movement is necessary for checking a blind spot.

FIG. 3 shows a schematic block diagram of a control system 30 for automatically positioning the mirrors of the present invention separately or in unison by remote control. Control system 30 includes a controller 31 connected to motor drivers 32–39. Each motor driver 32–39 is connected to an electric motor 42–49, respectively. On the left side of the vehicle, motors 42 and 43 are arranged in a known manner for adjusting exterior mirror 11 around horizontal and vertical adjustment axes, respectively, associated with mirror 11. Similarly, motors 44 and 45 are arranged in a known manner for adjusting interior mirror 12 around horizontal and vertical adjustment axes, respectively, associated with mirror 12. On the right side of the vehicle, motors 46 and 47 are arranged in a known manner for adjusting exterior mirror 18 around horizontal and vertical adjustment axes, respectively, associated with mirror 18. Likewise, motors 48 and 49 are arranged in a known manner for adjusting interior mirror 19 around horizontal and vertical adjustment axes, respectively, associated with mirror 19.

Selection switch 40 is operatively connected to controller 31 for selecting one or several of mirrors 11, 12, 18 and 19 for adjustment. For example, one position of switch 40 can select mirror 11 for adjustment, while another position can select mirrors 11 and 12 for adjustment in unison. Still another position of switch 40 can select mirrors 18 and 19 for adjustment in unison and another position can select all the mirrors for adjustment together in unison. Other well-known arrangements of switches can be used for switch 40 for selecting one or a plurality of the mirrors for adjustment.

Switches 41 are operatively connected in a known manner to controller 31 for adjusting the mirror or mirrors selected by selection switch 40. Adjustment signals output from switches 41 are converted by controller 31 either digitally or using analog techniques into drive control signals for output to the motor drivers associated with the mirror or mirrors selected by selection switch 40. The motor drivers 32–39 convert the drive control signals output from controller 31 into motor drive signals having an appropriate level for driving the respective motors 42–49. Other well-known techniques for operatively driving motors 42–49 can also be used.

FIG. 4 shows a schematic block diagram of a control system 50 for automatically adjusting the mirrors of the present invention by remote control which includes a memory for storing a plurality of preset mirror positions. Control system 50 differs from control system 30 by utilizing a microprocessor 51, a memory 52 and a selection switch 53 having a programming button 54. In a program mode of control system 50, for example, the mirrors can be adjusted to a desired setting, given a setting selection number by selection switch 53 and programmed into memory 52 by actuating program switch 54. Of course, other well-known techniques also can be used for programming mirror settings into memory 52. In a normal mode of control system 50, when it is desired to adjust the mirrors to a particular mirror setting previously stored in memory 52, selection switch 53 is actuated to select the desired mirror setting. Microprocessor 51 responds by retrieving the selected mirror setting from memory 52 and outputting appropriate drive control signals to motor drivers for adjusting the mirrors. Thus, control system 50 allows for a plurality of mirror settings to be automatically set for a number of different drivers of the vehicle or driving situations.

Figure 5A:
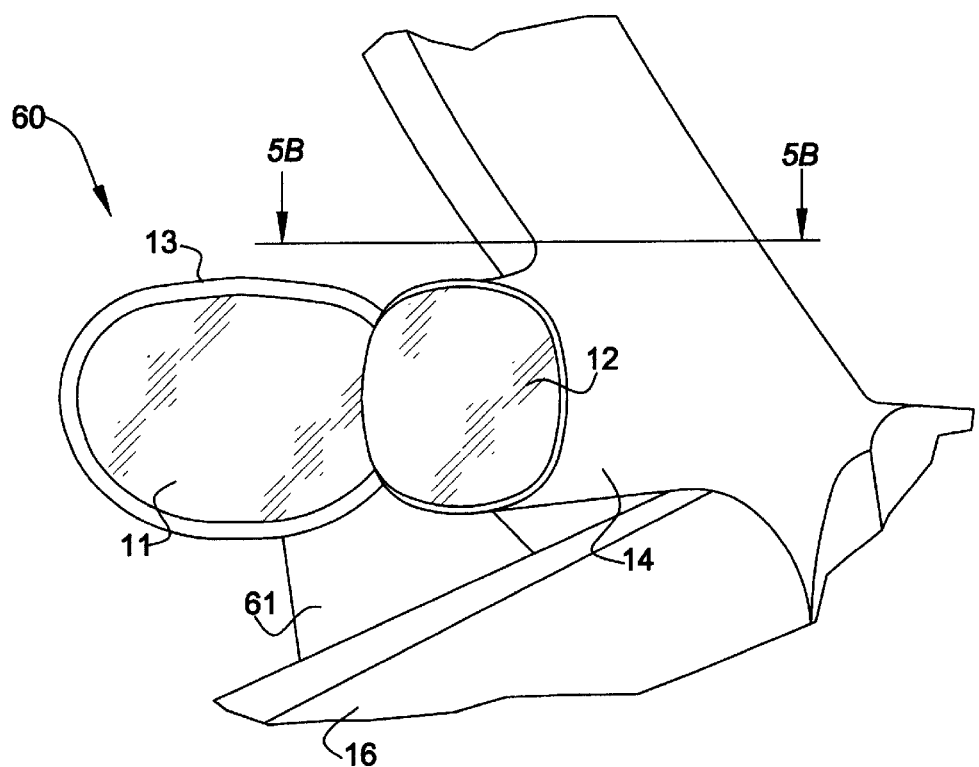
FIG. 5A shows a perspective view of a second embodiment of a side rear view mirror arrangement according to the present invention for a vehicle having a side mirror mounted to a door with a cantilever arm.
Figure 5B:
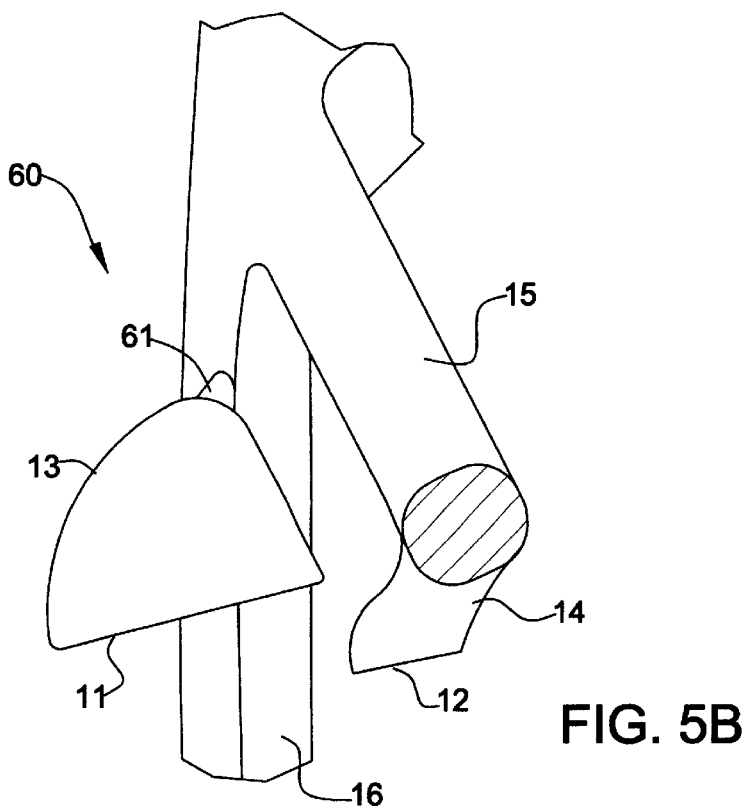
FIG. 5B is a top view of the second embodiment of a side view mirror according to the present invention taken along line 5—5 in FIG. 5A.

FIGS. 5A and 5B show perspective and top views, respectively, of a second embodiment of a left-side rear view mirror arrangement 60 according to the present invention for a vehicle having an external side mirror mounted to a door with a cantilever arm. Mirror arrangement 60 includes exterior mirror 11 attached to the door on the left side of a vehicle and a second internal mirror 12 mounted to the left roof-supporting column 15 of the vehicle. External mirror 11 is adjustably mounted within an exterior mirror housing 13 which is attached to the door 16 of the vehicle with cantilever arm 61. Internal mirror 12 is adjustably mounted within mirror housing 14 which is integrally formed with roof-supporting column 15.

As shown in FIG. 5A, mirrors 11 and 12 of the second embodiment are preferably disposed with respect to each other so reflected images of the mirrors appear to a driver to have no gap between the respective reflected images. Mirrors 11 and 12 can also be disposed with respect to each other so that the respective reflected images appear to the driver to be separated by a gap. As with the first embodiment, each mirror of the second embodiment is separately adjustable around horizontal and vertical adjustment axes associated with each of the mirrors for eliminating a blind spot on the driver's side of the vehicle normally which is associated with conventional side-view vehicle mirrors.

Figure 6A:
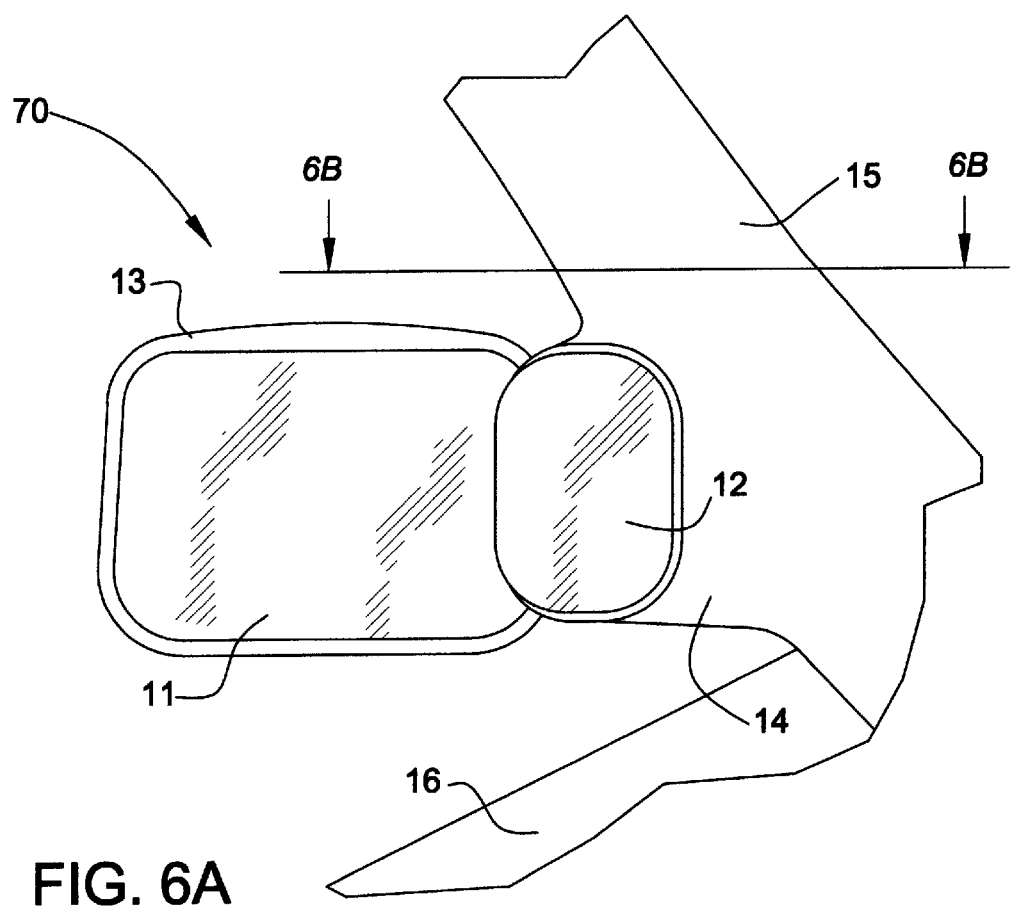
FIG. 6A shows a perspective view of a third embodiment of a side rear view mirror arrangement according to the present invention for a vehicle having an exterior side mirror mounted to an exterior portion of a roof-supporting column.
Figure 6B:
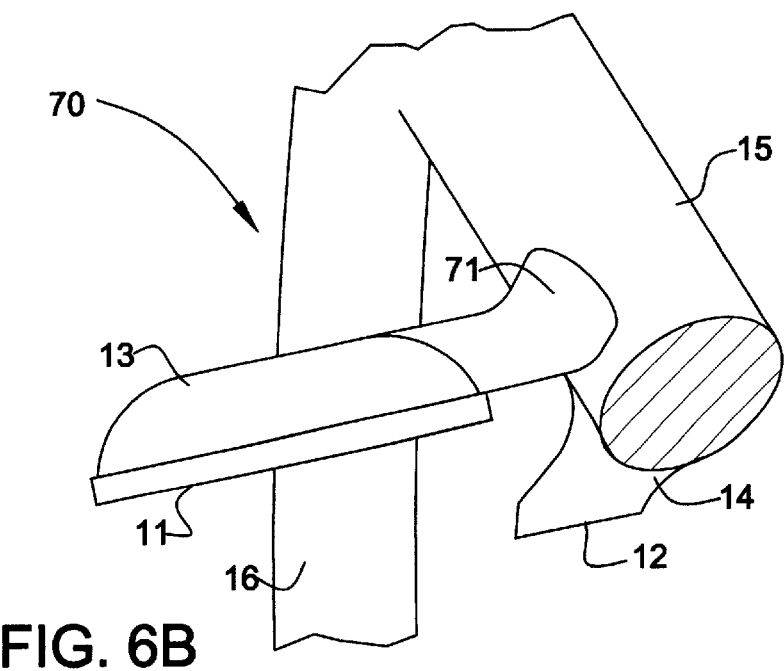
FIG. 6B is a top view of the third embodiment of a side view mirror according to the present invention taken along line 6—6 in FIG. 6A.

FIGS. 6A and 6B show perspective and top views, respectively, of a third embodiment of a left-side rear view mirror arrangement 80 according to the present invention. The third embodiment is particularly suited for a vehicle having an exterior side mirror mounted to an exterior portion of a roof-supporting column. As with the first and second embodiments, mirror arrangement 70 includes an exterior mirror 11 attached to an exterior portion of a roof-supporting column and a second internal mirror 12 mounted to the roof-supporting column 15 of the vehicle. External mirror 11 is adjustably mounted within an exterior mirror housing 13 which is attached to roof-supporting column 15 by cantilever arm 71. Cantilever member 71 has sufficient length and orientation so that exterior mirror 11 does not interfere with the window of door 16 when the door is open. Internal mirror 12 is adjustably mounted within mirror housing 14 which is integrally formed with roof-supporting column 15.

FIG. 6B shows that mirrors 11 and 12 of the third embodiment are preferably disposed with respect to each other the reflected images of the mirrors appear to a driver to have no gap between the respective reflected images. Mirrors 11 and 12 can also be disposed with respect to each other so that the respective reflected images appear to the driver to be separated by a gap. Each mirror of the second embodiment is separately adjustable around horizontal and vertical adjustment axes associated with each of the mirrors for eliminating a blind spot on the driver's side of the vehicle normally which is associated with conventional side-view vehicle mirrors.

Figure 7:
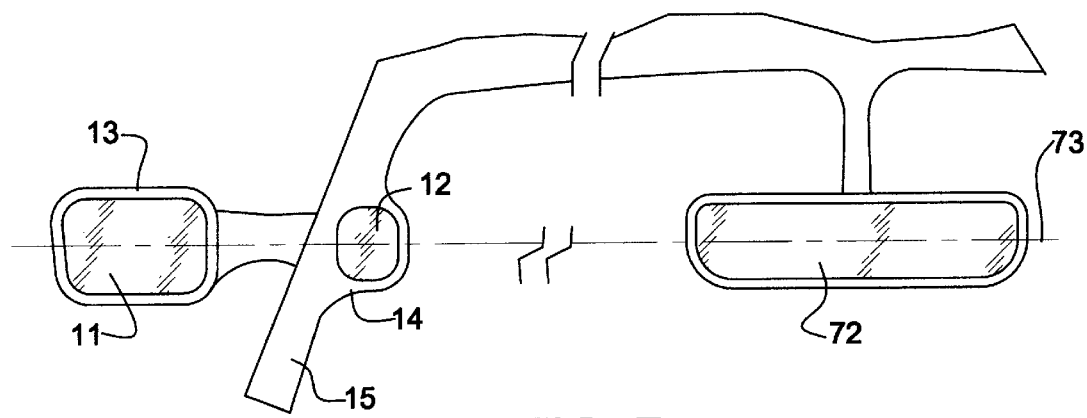
FIG. 7 shows a configuration of the third embodiment of a side view mirror according to the present invention in which the mirrors are on the same horizontal line as a center rear view mirror.

FIG. 7 shows a configuration of the third embodiment of the present invention in which mirrors 11 and 12 are on the same horizontal line 73 as a center rear view mirror 72. In this configuration, mirrors 11 and 12 are positioned relatively higher on the roof-supporting column 15 than the previously described embodiments. This allows a driver's eyes to scan along a single horizontal line when checking the rear view provided by the mirrors.

FIG. 8 shows a fourth embodiment of a left side rear view mirror arrangement 80 of the present invention. Mirrors 81–83 are each mounted internally in the vehicle on a roof-supporting column 15. Mirror 81 provides a rear side view corresponding to mirror 11 of the previously described embodiments, while mirror 82 provides a rear blind spot view. Mirror 83 provides a rear side view of the vehicle so that a blind spot normally associated with a rear roof-supporting column of the vehicle is viewed. Mirrors 81–83 are shown disposed with respect to each other so the reflected images of the mirrors appear to have a small gap between the respective reflected images. Mirrors 81–83 can also be disposed with respect to each other so that the respective reflected images appear to the driver to be separated by substantially no gap. Each mirror is separately adjustable around horizontal and vertical adjustment axes for eliminating the various blind spots on the driver's side of the vehicle. A second similar mirror arrangement can be mounted on the right side of the vehicle for eliminating blind spots on the passenger side of the vehicle. Mirrors 81–83 are adjustably mounted within mirror housings 84 which is integrally formed with roof-supporting column 15.

FIGS. 9A and 9B show a fifth embodiment of a left side rear view mirror arrangement 90 of the present invention. Mirror arrangement 90 is mounted to roof-supporting column 15 with a telescoping arm 91 for optimally positioning mirror 11 with respect to mirror 12 along the longitudinal axis of telescoping arm 91 for eliminating the blind spot. FIG. 9A shows telescoping arm 91 in a non-extended position, while FIG. 9B shows telescoping arm 91 in an extended position. Like the embodiments described above, both mirrors 11 and 12 are independently adjustable around horizontal and vertical adjustment axes associated with each mirror.

FIGS. 10A and 10B show a sixth embodiment of a left side rear view mirror arrangement 100 of the present invention. Mirror arrangement 100 is mounted to the body 102 of a vehicle, such as a door or the hood, and includes a telescoping arm 101 for optimally positioning mirror 11 along the longitudinal axis of telescoping arm 101 with respect to mirror 12. FIGS. 10A and 10B show telescoping arm 101 in non-extended and extended positions, respectively. Both mirrors 11 and 12 are independently adjustable.

Figure 11A:
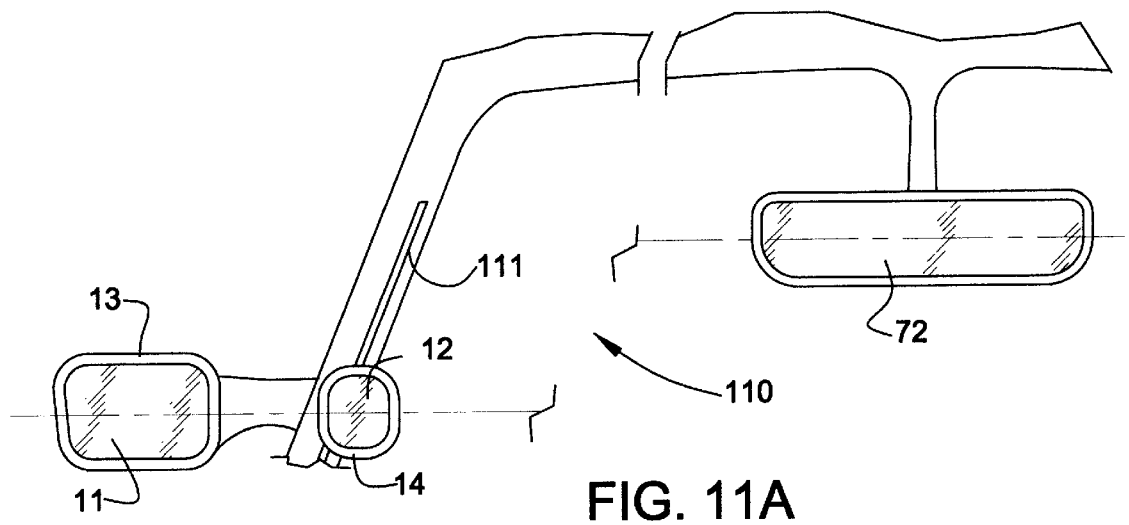
FIGS. 11A and 11B show a seventh embodiment of a left side rear view mirror arrangement according to the present invention.
Figure 11B:
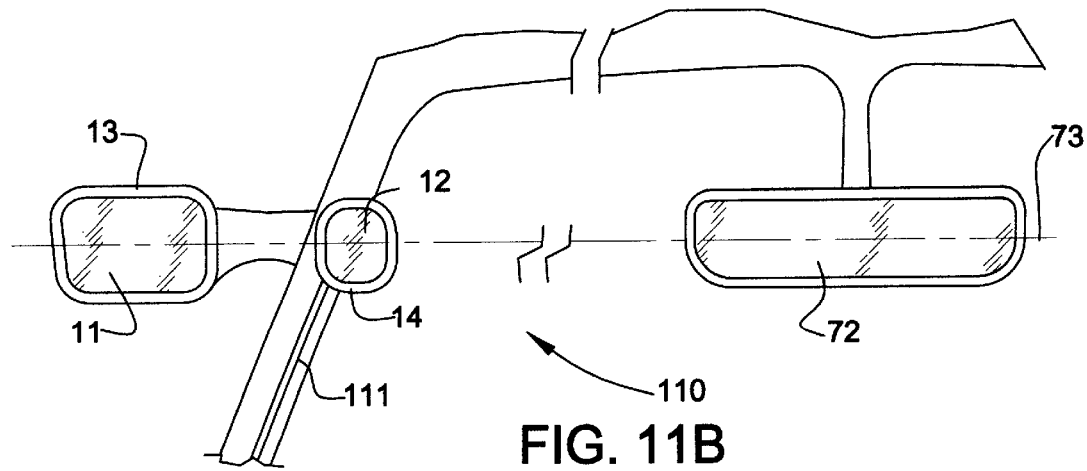

FIGS. 11A and 11B show a seventh embodiment of a left side rear view mirror arrangement 110 of the present invention. The seventh embodiment provides features of the third and the sixth embodiments of the invention by having both the first and second mirrors 11 and 12 adjustable up and down along roof-supporting column 15. FIG. 1A shows mirrors 11 and 12 positioned at the lowest position along column 15, while FIG. 11B shows the mirrors positioned at the highest position. A motor (FIG. 12) is remotely controlled to move mirrors 11 and 12. FIGS. 11A and 11B show slot 111 which allows mirror housing 14 to move up and down along column 15. This embodiment allows a driver to adjust the height of the first and second mirrors with respect to center rear view mirror 72 so that the mirrors can be scanned along a single horizontal line 73, shown in FIG. 11B. A similar arrangement 110 can be located on the right side of a vehicle. While both mirrors 11 and 12 are shown being fixed with respect to each other, they can be separately adjustable, with mirror 11 being adjustable as shown in FIGS. 9 and 10. Additionally, the mirrors of the seventh embodiment can be configured like the mirrors of the fourth embodiment with internal mirrors 81–83 mounted to the column 15 and adjustable up and down along column 15.

Figure 12:
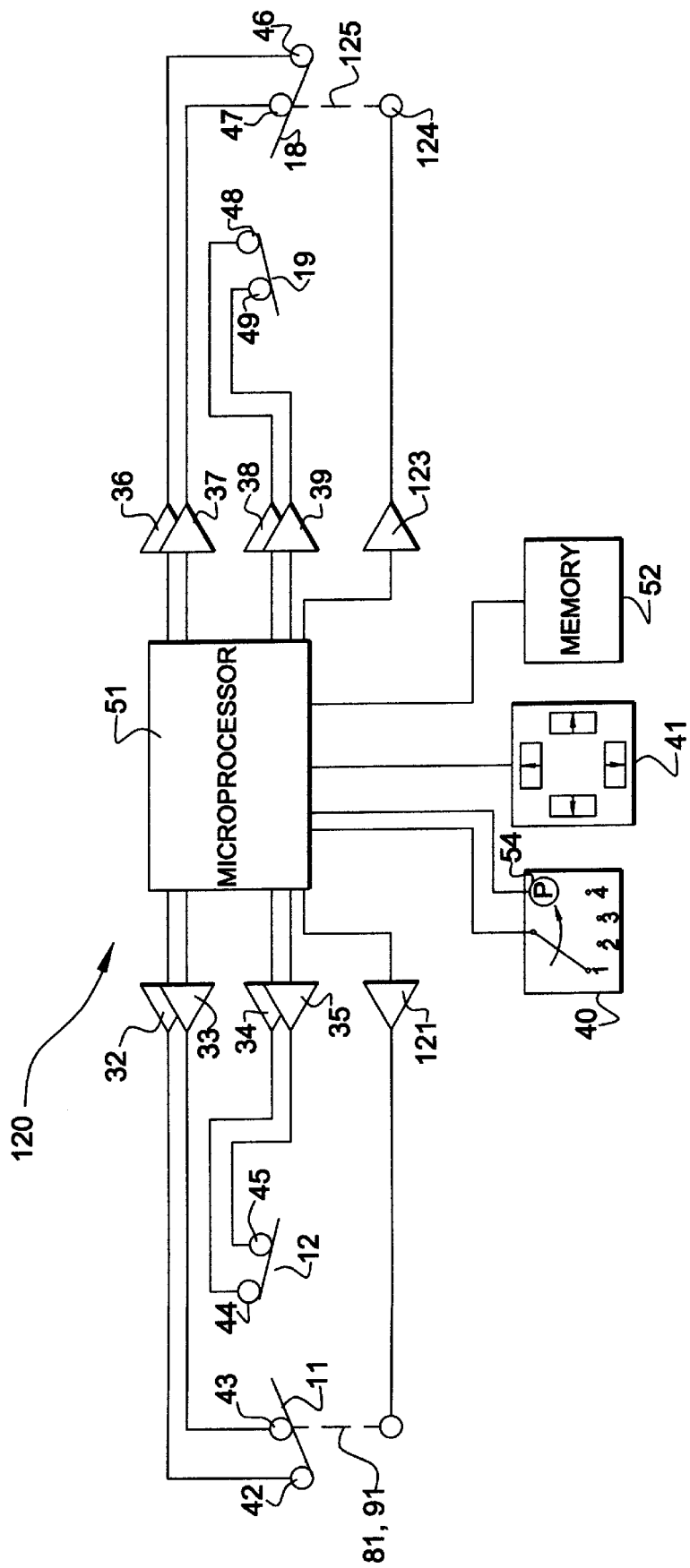
FIG. 12 shows a schematic block diagram of a control system for use with the fifth, sixth or seventh embodiments of the present invention for automatically positioning the mirrors separately or in unison by remote control.

FIG. 12 shows a schematic block diagram of a control system 120 for use with the fifth, sixth or seventh embodiments of the present invention for automatically positioning the mirrors separately or in unison by remote control. Control system 120 is similar to control system 50, shown in FIG. 4, but includes motor driver 121 and electric motor 122. When control system 120 is used with the fifth or the sixth embodiments of the invention, electric motor 122 adjusts telescoping arm 91 or 101, respectively, which is associated with mirror 11. When control system 120 is used with the seventh embodiment of the invention, electric motor 122 adjust the height of the mirrors along roof-supporting column 15.

FIG. 12 also shows that control system 120 can include motor driver 123 and electric motor 124. Motor 124 adjusts a telescoping arm 125 associated with mirror 18 on the right side of the vehicle when control system 120 is used with the fifth or sixth embodiments of the invention. Motor 124 adjusts the height of the mirrors along roof-supporting column 15 for the seventh embodiment of the invention. In addition to storing preset mirror positions for the mirrors, memory 52 also stores information relating to preset positions of telescopic arms 91, 101 and 125 for positioning mirrors 11 and 18, or a preset position of the mirrors along column 15 depending upon the embodiment of the invention controller 120 is used with. Controller 120 can be configured to automatically position the mirrors to a coarse position when the vehicle is started, then retrieve a default mirror setting from memory 52 for positioning the mirrors in a desired setting, including a fine position of the mirrors. When the vehicle ignition is turned off, controller 120 can be configured to retract the telescoping arms or to move the mirrors of the seventh embodiment to one of the extreme positions along column 15.

Each of the different embodiments of the present invention can include a second similar arrangement of mirrors on the right-side of the vehicle, as shown in FIG. 2A, and/or a control system for adjusting the mirrors by remote control. Additionally, each of the respective embodiments can be used on vehicles having a frame around a door window without significant changes. The various controllers of the present invention can each be adapted to adjust the mirrors of any of the various embodiments of mirror arrangements of the present invention.

The scope of the invention should only be limited by the following claims.

What is claimed is:

1. A mirror assembly for a vehicle comprising:
   a first mirror attached externally to the vehicle for providing a side rear view along a side of the vehicle to a driver of the vehicle; and
   a second mirror attached internally to the vehicle to a roof-supporting column of the vehicle for providing a blind spot view to the driver, the roof-supporting column supporting a roof of the vehicle,
   the first and second mirrors being separately adjustable.

2. The mirror assembly according to claim 1, wherein the first and second mirrors are disposed with respect to each other so that a reflected image of the first mirror and a reflected image of the second mirror appear to the driver to have substantially no gap between the respective reflected images of the first and second mirrors.

3. The mirror assembly according to claim 1, where the first and second mirrors are adjustable along the roof-supporting column.

4. The mirror assembly according to claim 1, further comprising a control system coupled to the first and second mirrors for adjusting the first and second mirrors by remote control.

5. The mirror assembly according to claim 4, wherein the control system includes a memory for storing a plurality of preset positions of the first and second mirrors.

6. The mirror assembly according to claim 4, wherein the control system adjusts the first and second mirrors in unison.

7. The mirror assembly according to claim 4, wherein the first mirror is mounted to the vehicle on a telescoping arm, and the control system further controls a position of a telescoping arm.

8. The mirror assembly according to claim 1, wherein at least one of the first and second mirrors includes a plurality of partially reflecting mirrors.

9. The mirror assembly according to claim 1, wherein the first mirror is a convex mirror.

10. The mirror assembly according to claim 9, wherein the second mirror is a convex mirror.

11. The mirror assembly according to claim 1, further comprising:

- a third mirror attached externally to the vehicle for providing a side rear view along another side of the vehicle to the driver of the vehicle; and
- a fourth mirror attached internally to the vehicle to another roof-supporting column of the vehicle for providing a blind spot view to the driver, the another roof-supporting column supporting the roof of the vehicle, the third and fourth mirrors being separately adjustable.

12. The mirror assembly according to claim 11, wherein the third and fourth mirrors are disposed with respect to each other so that a reflected image of the third mirror and a reflected image of the fourth mirror appear to the driver to have substantially no gap between the respective reflected images of the third and fourth mirrors.

13. The mirror assembly according to claim 11, further comprising a control system coupled to the first, second, third and fourth mirrors for adjusting the first, second, third and fourth mirrors by remote control.

14. The mirror assembly according to claim 13, wherein the control system includes a memory for storing a plurality of preset positions of the first, second, third and fourth mirrors.

15. The mirror assembly according to claim 13, wherein the control system adjusts the third and fourth mirrors in unison.

16. The mirror assembly according to claim 13, wherein the first mirror is mounted to the vehicle on a first telescoping arm and third mirror is mounted to the vehicle on a second telescoping arm, and the control system controls a position of each of the first and second telescoping arms.

17. The mirror assembly according to claim 12, where the first and second mirrors are adjustable along the roof-supporting column, the third and fourth mirrors are adjustable along the another roof-supporting column.

* * * * *